(12) United States Patent
Lowell et al.

(10) Patent No.: US 10,303,472 B2
(45) Date of Patent: May 28, 2019

(54) BUFFERLESS COMMUNICATION FOR REDUNDANT MULTITHREADING USING REGISTER PERMUTATION

(71) Applicant: Advanced Micro Devices, Inc., Sunnyvale, CA (US)

(72) Inventors: Daniel I. Lowell, Austin, TX (US); Manish Gupta, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 145 days.

(21) Appl. No.: 15/359,236

(22) Filed: Nov. 22, 2016

(65) Prior Publication Data

US 2018/0143829 A1 May 24, 2018

(51) Int. Cl.
*G06F 9/30* (2018.01)
*G06F 9/48* (2006.01)
*G06F 9/46* (2006.01)
*G06F 9/38* (2018.01)
*G06F 11/00* (2006.01)

(52) U.S. Cl.
CPC ........ *G06F 9/30032* (2013.01); *G06F 9/3824* (2013.01); *G06F 9/3851* (2013.01); *G06F 9/3861* (2013.01); *G06F 9/3887* (2013.01); *G06F 9/46* (2013.01); *G06F 11/00* (2013.01)

(58) Field of Classification Search
CPC ... G06F 9/3851; G06F 9/30072; G06F 9/3887
See application file for complete search history.

(56) References Cited

U.S. PATENT DOCUMENTS

| | | | | |
|---|---|---|---|---|
| 7,584,405 | B2 * | 9/2009 | Osecky | G06F 11/1497 707/999.008 |
| 8,112,614 | B2 * | 2/2012 | Nickolls | G06F 9/522 712/22 |
| 8,909,904 | B2 | 12/2014 | Sudhakar et al. | |

(Continued)

OTHER PUBLICATIONS

Wadden et al., "Real-World Design and Evaluation of Compiler-Managed GPU Redundant Multithreading", 2014, IEEE. (Year: 2014).*

(Continued)

*Primary Examiner* — Benjamin P Geib
(74) *Attorney, Agent, or Firm* — Meyertons Hood Kivlin Kowert and Goetzel PC; Rory D. Rankin

(57) ABSTRACT

Systems, apparatuses, and methods for implementing bufferless communication for redundant multithreading applications using register permutation are disclosed. In one embodiment, a system includes a parallel processing unit, a register file, and a scheduler. The scheduler is configured to cause execution of a plurality of threads to be performed in lockstep on the parallel processing unit. The plurality of threads include a first thread and a second thread executing on adjacent first and second lanes, respectively, of the parallel processing unit. The second thread is configured to perform a register permute operation from a first register location to a second register location in a first instruction cycle, with the second register location associated with the second processing lane. The second thread is configured to read from the second register location in a second instruction cycle, wherein the first and second instruction cycles are successive instruction cycles.

20 Claims, 9 Drawing Sheets

(56) References Cited

U.S. PATENT DOCUMENTS

| | | |
|---|---|---|
| 9,026,847 B2 | 5/2015 | Sridharan et al. |
| 9,047,192 B2 | 6/2015 | Sridharan et al. |
| 9,274,904 B2 | 3/2016 | Lyashevsky et al. |
| 9,367,372 B2 | 6/2016 | Lyashevsky et al. |
| 9,529,719 B2 | 12/2016 | Walker |

OTHER PUBLICATIONS

Wang et al., "Compiler-Managed Software-based Redundant Multi-threading for Transient Fault Detection", 2007, IEEE. (Year: 2007).*

Vijaykumar et al., "Transient-Fault Recovery Using Simultaneous Multithreading", 2002, IEEE. (Year: 2002).*

Mukherjee et al., "Detailed Design and Evaluation of Redundant Multithreading Alternatives", Proceedings of the 29th Annual International Symposium on Computer Architecture, May 25, 2002, pp. 99-110.

Reinhardt et al., "Transient Fault Detection via Simultaneous Multithreading", Proceedings of the 27th Annual International Symposium on Computer Architecture, Jun. 10, 2000, pp. 25-36, https://csdl.computer.org/csdl/proceedings/isca/2000/232/00/00854375.pdf. [Retrieved Sep. 14, 2018].

Smolens et al., "Fingerprinting: Bounding Soft-Error Detection Latency and Bandwidth", IEEE Micro, Nov. 1, 2004, 11 pages, https://infoscience.epfl.ch/record/135927/files/asplos04.pdf. [Retrieved Sep. 9, 2018].

\* cited by examiner

```
//work-item number = w_i
// w_i = 0 to 31 (16 odd, 16 even)
R1 = mul R3, 2;
R2 = R0 + 4;
Store R1, CommBuff[VAL_LOC];
Store R2, CommBuff[ADD_LOC];
memfence release;
If(w_i%2 != 0) {
    memfence acquire;
    R1p=LOAD CommBuff[VAL_LOC];
    R2p=LOAD CommBuff[ADD_LOC];
    If (R1!=R1p OR R2!=R2p)
        ErrReg = ErrReg + 1;
}
else
    Store R1, [R2];
```

```
//work-item number = w_i
// w_i = 0 to 31 (16 odd 16 even)
R1 = mul R3, 2;
R2 = R0 + 4;
R1p = permute(R1, w_{i-1})
R2p = permute(R2, w_{i-1})
If(w_i%2 != 0) {
    If (R1!=R1p OR R2!=R2p)
        ErrReg = ErrReg + 1;
}
else    Store R1, [R2];
```

FIG. 6

BUFFERLESS COMMUNICATION FOR REDUNDANT MULTITHREADING USING REGISTER PERMUTATION

The invention described herein was made with Government support under Prime Contract Number DE-AC52-07NA27344, Subcontract Number B609201 awarded by the United States Department of Energy. The United States Government has certain rights in the invention.

BACKGROUND

Description of the Related Art

Allocating and utilizing communication buffers on a graphics processing unit (GPU) increases resource utilization and increases latency of applications. There is a certain amount of overhead associated with communicating data between work-items, especially within a redundant multithreading (RMT) program. RMT is a technique that may be used to detect silent data corruption in hardware or software. The limitations of RMT include the communication overhead of sharing and comparing the results of redundant computation. For example, software-based RMT uses duplicate computations to detect errors. At certain points in the program, the values and addresses of two identical computations are checked for errors. Buffers can be used to share data for performing the error checking, and these buffers can be implemented in a dynamic random-access memory (DRAM) or local data share (LDS). However, communication buffers incur a cost in terms of latency, memory bandwidth reduction, and resource contention. If a producer work-item sends data to a consumer work-item, a synchronization overhead will occur as the consumer work-item waits for the value to appear visible to it either in a cache or in the DRAM.

BRIEF DESCRIPTION OF THE DRAWINGS

The advantages of the methods and mechanisms described herein may be better understood by referring to the following description in conjunction with the accompanying drawings, in which:

FIG. 5 illustrates one embodiment of pseudo code for implementing a RMT application.

FIG. 6 illustrates another embodiment of pseudo code for implementing a RMT application.

DETAILED DESCRIPTION OF EMBODIMENTS

Figure 1:
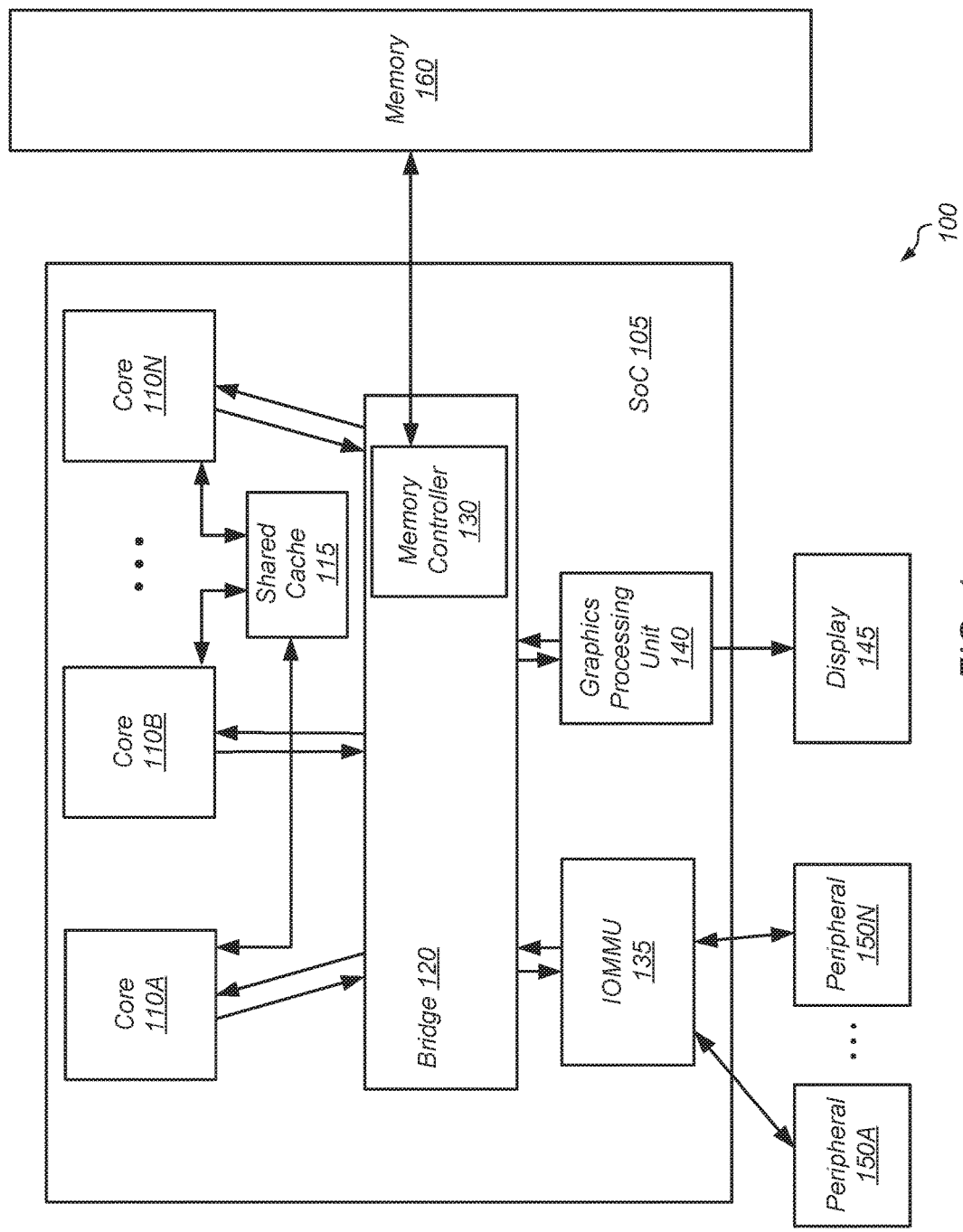
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing bufferless communication for redundant multithreading using register permutation are disclosed. In one embodiment, a system includes a parallel processing unit, a register file, and a scheduler. The scheduler is configured to cause execution of a plurality of threads to be performed in lockstep on the parallel processing unit. The plurality of threads include a first thread and a second thread executing on adjacent first and second processing lanes, respectively, of the parallel processing unit.

In one embodiment, the second thread is configured to perform a register permute operation from a first register location to a second register location in a first instruction cycle, with the second register location associated with and accessible by the second processing lane. It is noted that as used herein the term "instruction cycle" refers to an amount of time it takes for an instruction to fully execute. In various embodiments, an instruction cycle may correspond to one or more clock cycles. The second thread is configured to read from the second register location in a second instruction cycle, wherein the first and second instruction cycles are successive instruction cycles. In one embodiment, the register permute operation and the read operation can take more than one clock cycle to fully execute. Accordingly, the first instruction cycle corresponds to one or more clock cycles and the second instruction cycle corresponds to one or more clock cycles.

In one embodiment, the first and second threads are executing a same instruction sequence as part of a redundant multithreading (RMT) application. In one embodiment, the RMT application includes multiple other threads, with adjacent pairs of threads executing the same instruction sequence. In this embodiment, even-number threads are configured to write data to locations in the register file in a first instruction cycle. Odd-number threads are configured to read data from these locations in the register file in a second instruction cycle, with the first and second instruction cycles successive instruction cycles.

Since the first and second threads are executing in lockstep and the instruction sequence is known by the scheduler, the scheduler is configured to prevent the second thread from accessing the first register location in the first instruction cycle. The system is also configured to prevent the first thread from accessing the first register location in the second instruction cycle. In this way, the first and second threads can share data in the first register location in successive instruction cycles without using a memory fence or other synchronization event to prevent the first register location from being accessed by both threads in the same instruction cycle.

Referring now to FIG. 1, a block diagram of one embodiment of a computing system 100 is shown. In this embodiment, computing system 100 includes system on chip (SoC) 105 coupled to memory 160. SoC 105 is also referred to as an integrated circuit (IC). In some embodiments, SoC 105 includes a plurality of processor cores 110A-N and graphics processing unit (GPU) 140. It is noted that processor cores 110A-N are also referred to as processing units or processors. Processor cores 110A-N and GPU 140 are configured to execute instructions of one or more instruction set architectures (ISAs), which include operating system instructions and user application instructions.

In another embodiment, SoC 105 includes a single processor core 110. In multi-core embodiments, processor cores 110 can be identical to each other (i.e., symmetrical multi-core), or one or more cores can be different from others (i.e., asymmetric multi-core). Each processor core 110 includes one or more execution units, cache memories, schedulers, branch prediction circuits, and so forth. Input/output memory management unit (IOMMU) 135 is coupled to bridge 120 in the embodiment shown. In one embodiment, bridge 120 functions as a northbridge device and IOMMU 135 functions as a southbridge device in computing system 100. In other embodiments, bridge 120 is a fabric, switch, bridge, any combination of these components, or another component. A number of different types of peripheral buses (e.g., peripheral component interconnect (PCI) bus, PCI-Extended (PCI-X), PCIE (PCI Express) bus, gigabit Ethernet (GBE) bus, universal serial bus (USB)) can be coupled to IOMMU 135. Various types of peripheral devices 150A-N can be coupled to some or all of the peripheral buses. Such peripheral devices 150A-N include (but are not limited to) keyboards, mice, printers, scanners, joysticks or other types of game controllers, media recording devices, external storage devices, network interface cards, and so forth.

In some embodiments, SoC 105 includes a graphics processing unit (GPU) 140 that is coupled to display 145 of computing system 100. In other embodiments, GPU 140 is an integrated circuit that is separate and distinct from SoC 105. Display 145 can be a flat-panel LCD (liquid crystal display), plasma display, a light-emitting diode (LED) display, or any other suitable display type. GPU 140 performs various video processing functions and provides the processed information to display 145 for output as visual information. GPU 140 can also be configured to perform other types of tasks scheduled to GPU 140 by an application scheduler. GPU 140 includes a number 'N' of compute units for executing tasks of various applications or processes, with 'N' a positive integer. The 'N' compute units of GPU 140 are also referred to as "processing units" or as single instruction, multiple data (SIMD) units. Each 'N' compute unit includes 'M' processing elements, with 'M' a positive integer. The 'M' "processing elements" are also referred to as "processing lanes" or "lanes".

In GPU 140, work-items assigned to a processing element are referred to as a "workgroup". Two or more work-items that are issued for execution in parallel in a compute unit are referred to as a "wavefront". A workgroup includes one or more wavefronts. Other terms for wavefront include "warp" and "vector." The term "kernel", as used herein, refers to a program and/or processing logic that is executed as one or more work-items in parallel having the same code base. It should be noted that, in some embodiments, the terms "work-item" and "thread" are used interchangeably.

In one embodiment, physically adjacent work-items within a wavefront will have contiguous and known vector register addresses. In this embodiment, these know vector register addresses are utilized to retrieve data computed by a redundant work-item for error checking. In intra-workgroup redundant multi-threading (RMT) on GPU 140, work-items are run in lockstep such that the work-items will encounter a share and compare event, such as a store to memory 160, in the same instruction cycle. In one embodiment, to execute a RMT application, the number of work-items in a workgroup are doubled to produce redundant work-items across the application. Then, the redundant pairs of work-items execute on adjacent lanes of compute units in GPU 140. A first work-item of each redundant pair of work-items performs a permute operation in a first clock cycle to write the result of a computation to a register address of a second work-item of the redundant pair. As used herein, the term "register permute operation" is defined as moving a value from a first register to a second register, wherein the first register is assigned to a first processing lane, and wherein the second register is assigned to a second processing lane. It is noted that the terms "register permute operation" and "permute operation" are used interchangeably herein. Next, the second work-item of each redundant pair of work-items accesses the register address in a second clock cycle to retrieve the first work-item's result. In one embodiment, the first and second clock cycle are successive (i.e., back-to-back) clock cycles. Then, the second work-item compares the first work-item's result with the second work-item's result to determine if the results match. These operations are repeated for the other computations performed during the RMT application.

In one embodiment, memory controller 130 is integrated into bridge 120. In other embodiments, memory controller 130 is separate from bridge 120. Data accessed from memory 160 responsive to a read request is conveyed by memory controller 130 to the requesting agent via bridge 120. Responsive to a write request, memory controller 130 receives both the request and the data to be written from the requesting agent via bridge 120. If multiple memory access requests are pending at a given time, memory controller 130 arbitrates between these requests.

In some embodiments, memory 160 includes a plurality of memory modules. Each of the memory modules includes one or more memory devices (e.g., memory chips) mounted thereon. In some embodiments, memory 160 includes one or more memory devices mounted on a motherboard or other carrier upon which SoC 105 is also mounted. In some embodiments, at least a portion of memory 160 is implemented on the die of SoC 105 itself. Embodiments having a combination of the aforementioned embodiments are also possible and contemplated. In one embodiment, memory 160 is used to implement a random access memory (RAM) for use with SoC 105 during operation. The RAM implemented can be static RAM (SRAM), dynamic RAM (DRAM), or others. The type of DRAM that is used to implement memory 160 includes (but is not limited to) double data rate (DDR) DRAM, DDR2 DRAM, DDR3 DRAM, and so forth.

Although not explicitly shown in FIG. 1, SoC 105 can also include one or more cache memories that are internal to the processor cores 110 and/or GPU 140. For example, each of the processor cores 110 can include an L1 data cache and an L1 instruction cache. In some embodiments, SoC 105 includes a shared cache 115 that is shared by the processor cores 110. In some embodiments, shared cache 115 is a level two (L2) cache. In some embodiments, each of processor cores 110 has an L2 cache implemented therein, and thus shared cache 115 is a level three (L3) cache. Cache 115 can be part of a cache subsystem including a cache controller.

In various embodiments, computing system 100 can correspond to any of various types of computer systems or computing devices, including, but not limited to, a personal computer system, desktop computer, laptop or notebook computer, supercomputer, mobile device, tablet, phone, smartphone, mainframe computer system, handheld computer, workstation, network computer, watch, wearable device, a consumer device, server, file server, application server, storage server, web server, cloud computing server, or in general any type of computing system or device or portion thereof. It is noted that the number of components of computing system 100 and/or SoC 105 can vary from embodiment to embodiment. There can be more or fewer of each component/subcomponent than the number shown in FIG. 1. It is also noted that computing system 100 and/or SoC 105 can include other components not shown in FIG. 1. Additionally, in other embodiments, computing system 100 and SoC 105 can be structured in other ways than shown in FIG. 1.

Figure 2:
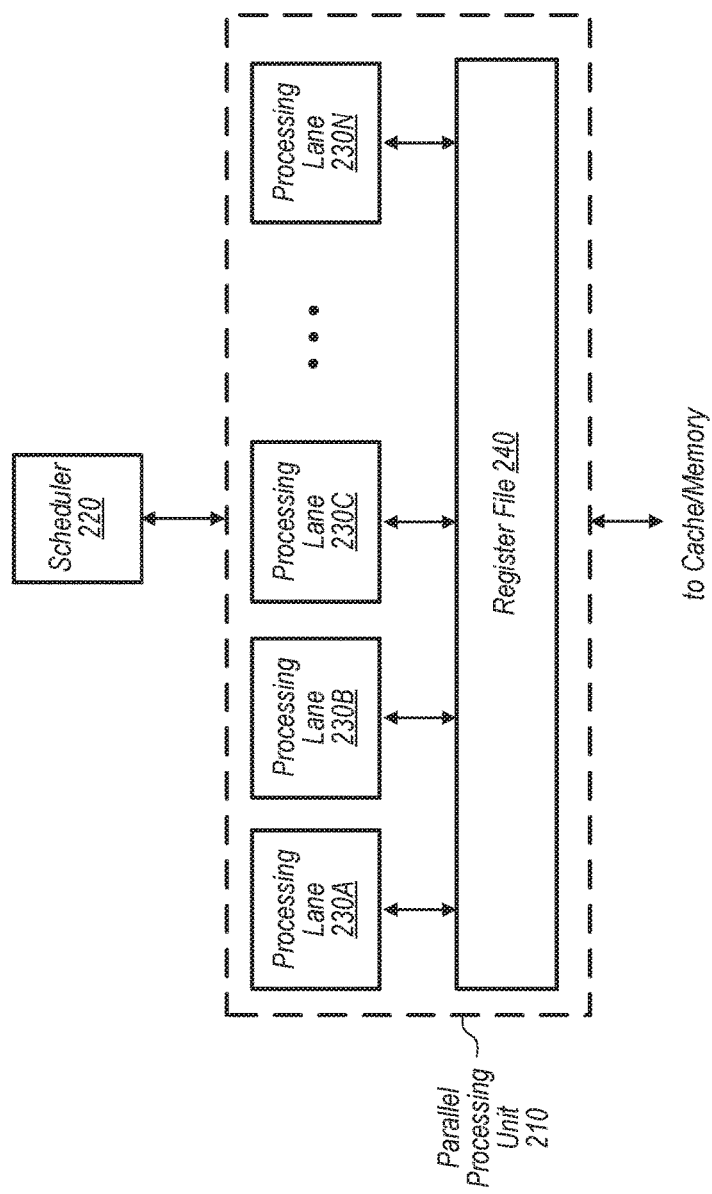
FIG. 2 is a block diagram of one embodiment of a parallel processor.

Turning now to FIG. 2, a block diagram of one embodiment of a parallel processor 200 is shown. In one embodiment, at least a portion of the circuitry of parallel processor 200 is included within GPU 140 (of FIG. 1). In other embodiments, the circuitry of parallel processor 200 is included within other types of processing units and/or other locations within a computing system (e.g., system 100 of FIG. 1). Parallel processor 200 includes at least parallel processing unit 210 and scheduler 220, and parallel processor 200 includes and/or is coupled to a cache or memory (not shown). Parallel processing unit 210, which can also be referred to as a "vector unit", includes processing lanes 230A-N, which are representative of any number and type of processing lanes 230A-N, with each processing lane 230A-N able to execute one or more instructions per clock cycle. In one embodiment, parallel processing unit 210 is a single instruction, multiple data (SIMD) unit. It is noted that parallel processor 200 also includes additional components and circuitry which are not shown to avoid obscuring the figure.

Scheduler 220 is configured to schedule operations for execution on processing lanes 230A-N of parallel processing unit 210. In one embodiment, scheduler 220 is coupled to another processor (e.g., central processing unit (CPU)) to receive kernels to be executed. Scheduler 220 is also configured to synchronize multiple threads which are executing on processing lanes 230A-N so that the threads are executing instructions in lockstep with each other. It is noted that the terms "threads" and "work-items" are used interchangeably herein.

In one embodiment, scheduler 220 is configured to schedule a RMT application for execution on parallel processing unit 210. In one embodiment, the threads of the RMT application are duplicated and scheduled for execution on adjacent processing lanes of parallel processing unit 210. A first thread of an adjacent, duplicate pair of threads is configured to execute the same instructions and perform the same computations as the second thread of the pair. When a computation has been performed, the first thread of the pair is configured to perform a permute operation to store the first thread's computation result in a register location of register file 240 where the second thread can access the result. While the first thread is performing the permute operation, the second thread is performing a predetermined operation which does not conflict with the first thread's permute operation. Depending on the embodiment, the predetermined operation is a nop instruction, a separate permute operation, or a separate operation that does not interfere with the first thread's permute operation targeting a specific register location. Then, after the first thread has performed the permute operation, the second thread accesses the first thread's computation result and compares it with the second thread's computation result. While the second thread is accessing the first thread's computation result, the first thread is performing a predetermined operation which does not conflict with the first thread's permute operation. Since the first and second thread are executing in lockstep, these operations can be performed in back-to-back clock cycles, which helps speed up the RMT application and reduces overall inefficiency. Additionally, each of the redundant pairs of threads performs similar operations as those just described for the first and second threads.

In other embodiments, the same schemes described above are used in other types of software applications besides RMT applications. For example, in one embodiment, threads executing on processing lanes 230A-N perform various computations and then share the computations with other threads executing on other lanes. When data is shared between threads executing on different lanes, a first thread performs a register permute operation from a first register location to a second register location in register file 240 during a first clock cycle when only the first thread will be accessing the first and second register locations. The second register location is chosen such that the location is accessible to a second thread. Then, the second thread reads the data from the second register location during a second clock cycle when only the second thread will be accessing the second register location. Scheduler 220 is configured to schedule instructions for execution on processing lanes 230A-N to ensure that register locations are only accessed by a single thread in a given clock cycle. These techniques enable the sharing of data between threads without the overhead of memory fences or other synchronization events.

Register file 240 is representative of any number, size, and type of storage structure(s) for storing data for operations performed by threads executing on processing lanes 230A-N. It is noted that in one embodiment register file 240 is also referred to as a "vector register file". In one embodiment, register file 240 is a single structure which is shared by processing lanes 230A-N. In another embodiment, register file 240 is split into smaller register file structures, with each smaller structure accessible by one or more processing lanes 230A-N. For example, in one embodiment, each group of four processing lanes 230A-N shares a separate portion of register file 240. These four processing lanes 230A-N have access to the portion of register file 240, and each processing lane has assigned locations within this portion. In other embodiments, other schemes for sharing and/or splitting register file 240 into structures which are usable by processing lanes 230A-N are possible and are contemplated.

Figure 3:
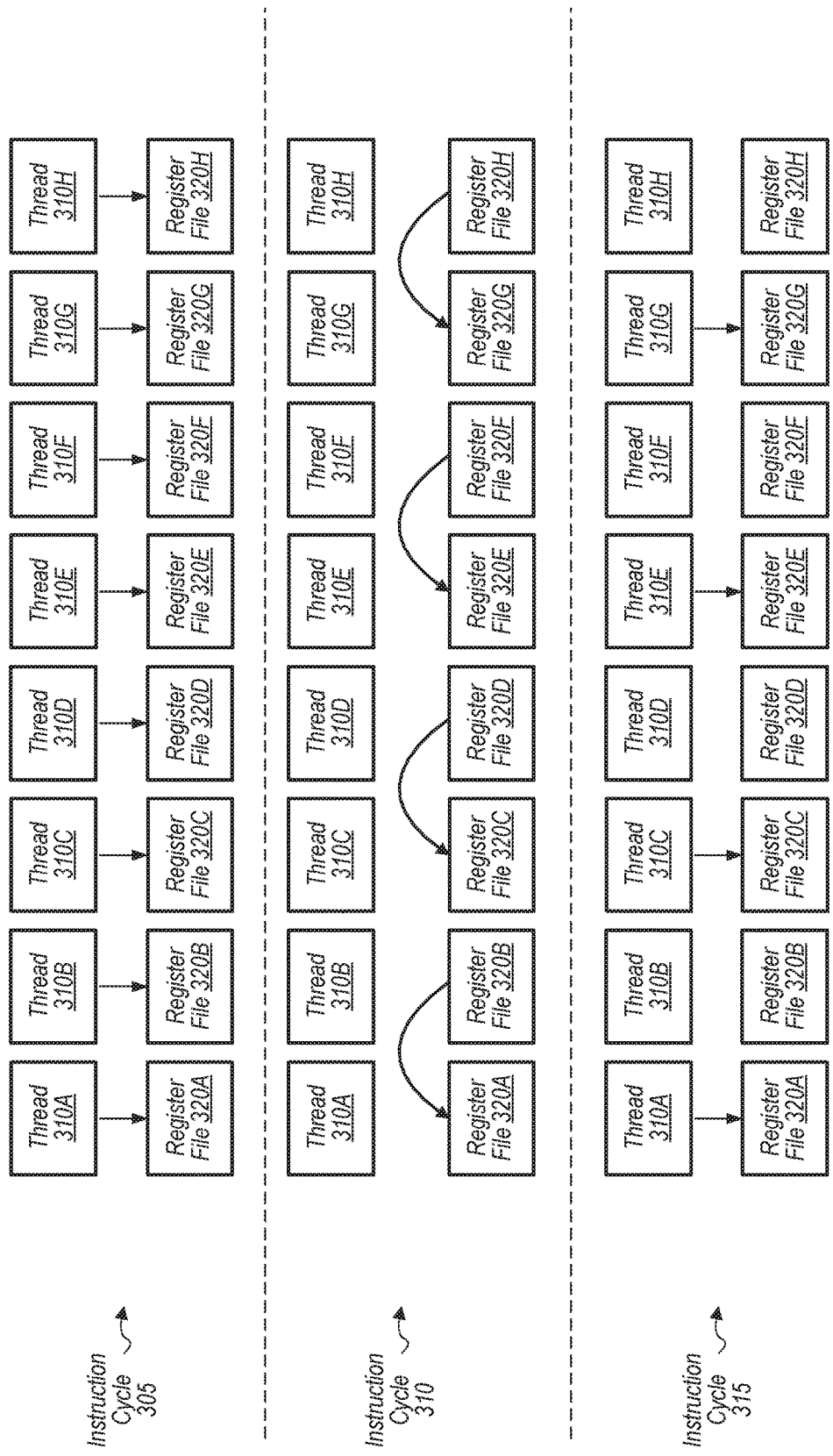
FIG. 3 is a block diagram of one embodiment of sharing data between threads executing on a parallel processor.

Referring now to FIG. 3, a block diagram of one embodiment of sharing data between threads executing on a parallel processing unit is shown. On the top of FIG. 3, threads 310A-H are shown writing data to their individual register files 320A-H, respectively, in instruction cycle 305. In one embodiment, threads 310A-H are executing a RMT application. In other embodiments, threads 310A-H are executing other type(s) of software application(s) which involve sharing data between threads.

Next, in instruction cycle 310, the computation result data in register files 320B, 320D, 320F, and 320H is copied to register files 320A, 320C, 320E, and 320G, respectively. The computation data which is copied in instruction cycle 310 is the computation data which was written to register files 320B, 320D, 320F, and 320H in instruction cycle 305 by threads 310B, 310D, 310F, and 310H, respectively. During instruction cycle 310, only one thread of each pair of threads is performing the permutation operation to transfer data between adjacent register files. The other thread is idle or performing an operation which does not conflict with its adjacent thread of the pair. It is assumed for the purposes of this discussion that instruction cycle 310 is subsequent to instruction cycle 305. In one embodiment, instruction cycle 310 is the instruction cycle immediately following instruction cycle 305. In other words, in this embodiment, instruction cycles 305 and 310 are successive instruction cycles. It is noted that the term "successive" is defined as consecutive or one following another.

Next, in instruction cycle 315, the threads 310A, 310C, 310E, and 310G are able to access the data copied into register files 320A, 320C, 320E, and 320G, respectively, to perform a comparison of results or to perform some other operation. Threads 310B, 310D, 310F, and 310H are inactive or perform operations which do not conflict with the accesses of threads 310A, 310C, 310E, and 310G in instruction cycle 315. In one embodiment, instruction cycle 315 is the instruction cycle immediately following instruction cycle 310.

Figure 4:
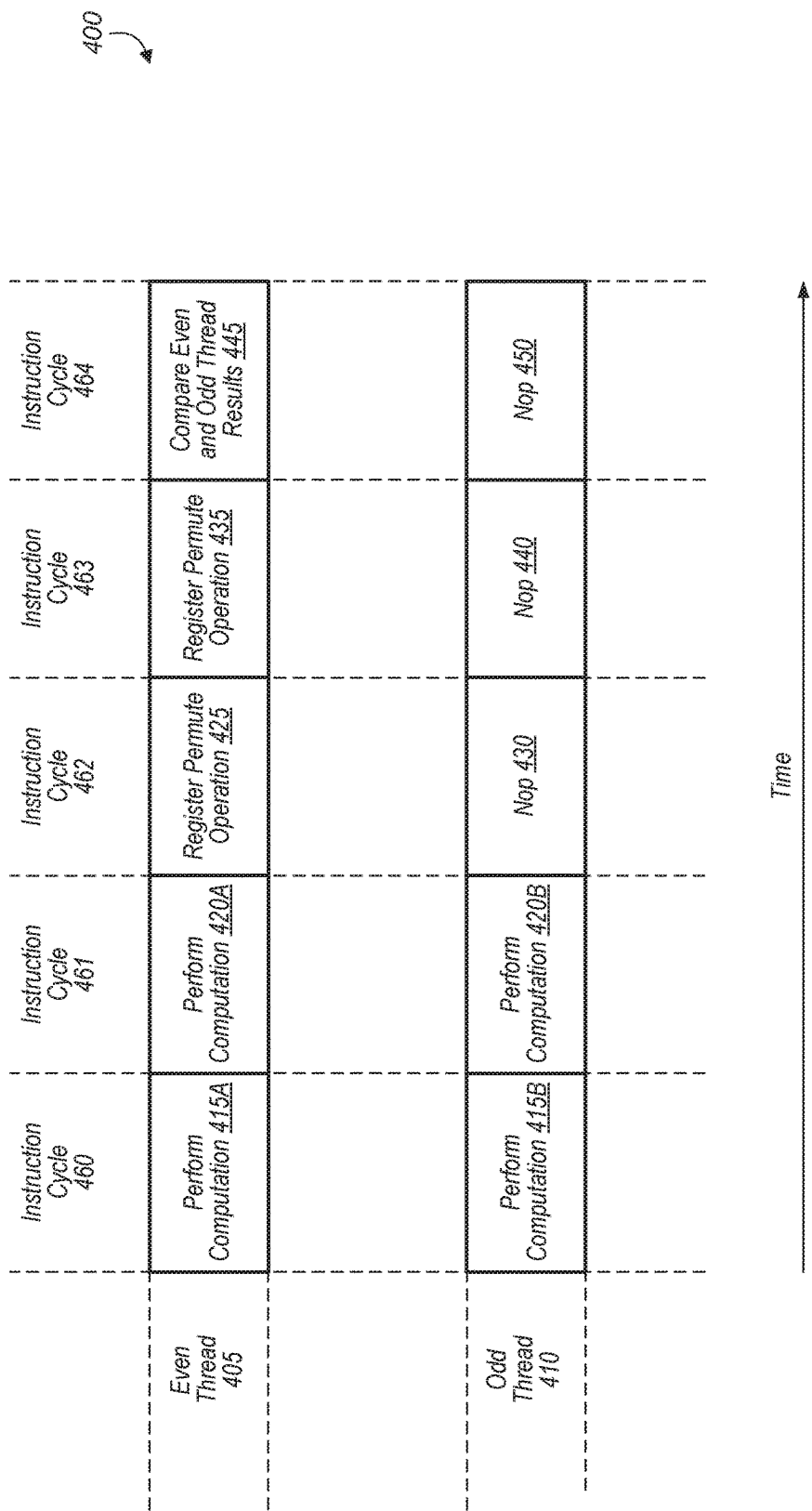
FIG. 4 is a timing diagram of one embodiment of two threads of a redundant multithreading (RMT) application.

Turning now to FIG. 4, a timing diagram 400 of one embodiment of two threads of a RMT application is shown. In timing diagram 400, time proceeds from left to right, and the instructions executed by even thread 405 and odd thread 410 are represented by boxes on the timeline to the right of their labels. In one embodiment, even thread 405 executes on an even-numbered processing element of a parallel processor while odd thread 410 executes on an odd-numbered processing element of the parallel processor. Depending on the embodiment, the parallel processor has any number of processing elements for processing any number of threads.

The instructions being executed by even thread 405 during instruction cycles 460-464 are shown on the top of FIG. 4. Instruction cycles 460-464 are intended to represent successive instruction cycles of a parallel processing unit (e.g., parallel processing unit 210 of FIG. 2). In one embodiment, each instruction cycle 460-464 corresponds to a single clock cycle. In another embodiment, an instruction can take several clock cycles to fully execute. In this embodiment, each instruction cycle 460-464 can correspond to different numbers of clock cycles. The instructions being executed by odd thread 410 during the same instruction cycles 460-464 are shown on the bottom of FIG. 4. In one embodiment, even thread 405 and odd thread 410 are synchronized so that they execute in lockstep for the RMT application. To implement the RMT application, even thread 405 is programmed to execute the same instructions and perform the same computations as odd thread 410. Any number of other pairs of threads executing on the parallel processing unit are also utilized to perform redundant computations as part of the overall RMT application.

In instruction cycle 460, even thread 405 performs computation 415A and odd thread 410 performs computation 415B. In instruction cycle 461, even thread 405 performs computation 420A and odd thread 410 performs computation 420B. It is assumed for the purposes of this discussion that computation 415A and computation 415B are the same computations and that computation 420A and computation 420B are the same computations. Then, in instruction cycle 462, even thread 405 executes register permute operation 425 to permute the computation result from computation 415B to a register location accessible by even thread 405. During instruction cycle 462, odd thread 410 executes a nop 430 to stay in lockstep with even thread 405. In another embodiment, odd thread 410 performs another predetermined operation in instruction cycle 462 which does not conflict with the permute operation 425 performed by even thread 405.

In instruction cycle 463, even thread 405 performs register permute operation 435 to permute the computation result from computation 420B to a register location accessible by even thread 405. During instruction cycle 463, odd thread 410 executes a nop 440 to stay in lockstep with even thread 405. In instruction cycle 464, even thread 405 performs a comparison operation 445 to compare the computation results of computations 415A and 415B with the computation results of computations 420A and 420B. In instruction cycle 464, odd thread 410 performs nop 450 to stay in lockstep with even thread 405. Even thread 405 determines if the computation results match for the duplicate computations being executed by even thread 405 and odd thread 410. In one embodiment, if the computation results match, then these results are stored to the register file and/or memory. If the computation results differ, then even thread 405 increments an error value. In other embodiments, even thread 405 takes other actions in response to the results of the comparison.

Referring now to FIG. 5, one embodiment of pseudo code 500 for implementing a redundant multithreading (RMT) application is shown. Pseudo code 500 represents one technique for implementing a RMT application by using communication buffers to share data between redundant work-items. Each work-item is duplicated in the example illustrated by pseudo code 500, and each work-item computes the multiplication of register R3 and the value of 2. Register R1 stores the data value. The address location for the store is computed using the base address in R0. Register R2 stores the address location.

Based on pseudo code 500, the work-items will store the values in registers R1 and R2 to a communication buffer. Next, the memory barriers "memfence release" and "memfence acquire" are executed to ensure that the store operations are committed prior to any loads to the communication buffer. Then, every other work item will load the values from the communication buffer and compare these values to the own work item's results. If the results match, then the data value in register R1 is stored to the address location in register R2. Otherwise, if the results do not match, then an error value "ErrReg" is incremented. The use of the communication buffer involves the use of an additional buffer and incurs the latency of the memory barriers.

Turning now to FIG. 6, another example of pseudo code 600 for implementing a RMT application is shown. Pseudo code 600 represents another technique for implementing a RMT application without using communication buffers to share data between redundant work-items. Rather, adjacent work-items can share data using register locations in a register file that is accessible to a pair of work-items that are executing duplicate program instructions. For ease of discussion, it is assumed that each lane and work item has a group of registers allocated or assigned for its use. The registers assigned to a given work item are numbered similarly. For example, in the example, shown, the registers assigned to each work item each are designated R1-RN. Consequently, work item $w_i$ has a register R1 and work item also has a register R1. However, in other embodiments, those skilled in the art will appreciate that other embodiments may identify registers differently. For example, identification of a given register for a work item could be done using a relative indication (e.g., an offset) or otherwise. These and other embodiments are possible and are contemplated.

The initial computations of pseudo code 600 match those from pseudo code 500. Accordingly, each work-item computes the multiplication of register R3 and the value of 2.

Register R1 stores the data value. The address location for the later store operation (i.e., Store R1, [R2]) is computed using the base address in R0. Register R2 stores the address location. Instead of storing the results in a communication buffer, the results are stored to register locations "R1$p$" and "R2$p$" using a register permute operation. In the example shown, the permute operation includes a permute instruction with two parameters. The first parameter is the identification of a register and the second parameter is the identification of a work item that corresponds to the identified register. Therefore, the instruction "permute(R1, $w_{i-1}$)" refers to register R1 of work item $w_{i-1}$. As the work item for the present lane is work item $w_i$, work item $w_{i-1}$ refers to an adjacent work item/lane (adjacent either physically or logically). It is noted that other embodiments may refer to other work items (e.g., $w_{i-3}$, etc.). In one embodiment, every other work-item is enabled to perform the register permute operations using an execution mask. In one embodiment, the mask includes a bit for each work item with the bit indicating whether or not the permute operation (and corresponding error checking) is to be performed. For example, in one embodiment the mask has every other bit set. In such an embodiment, the code may include a conditional statement (not shown) to determine whether permute operation(s) is performed. If the mask bit for that work item is set, then the condition is satisfied and the permute operation is performed. Otherwise, the permute operation is not performed. These and other embodiments are possible and are contemplated for determining when permute operations are performed by the work item. In one embodiment, the every other work-items which do not execute the register permute operations execute a nop operation in place of the register permute operation(s). Then, every other work-item performs a comparison of its own results to the results of the adjacent work-item. In various embodiments, this comparison occurs immediately following the register permute operations. Since adjacent work-items are executing in lockstep, the write to a given register value can be immediately followed by the read to the given register value since the instructions executed by the pair of adjacent work-items are known ahead of time.

Figure 7:
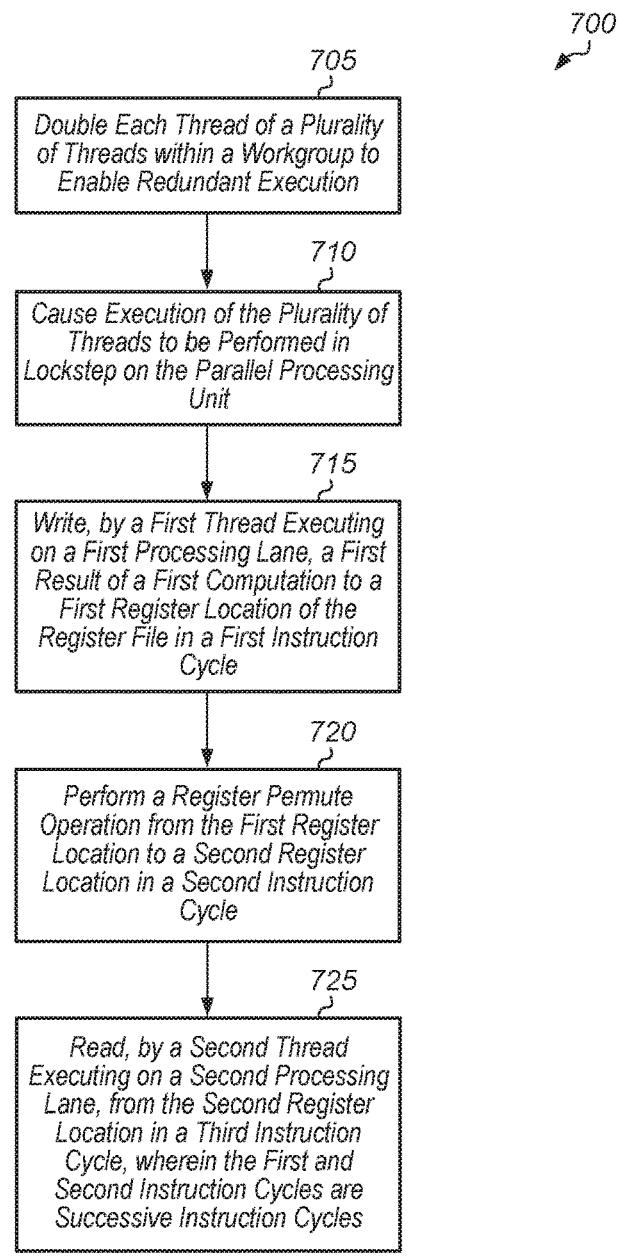
FIG. 7 is a generalized flow diagram illustrating one embodiment of a method for enabling bufferless communication between threads in a RMT application.
Figure 8:
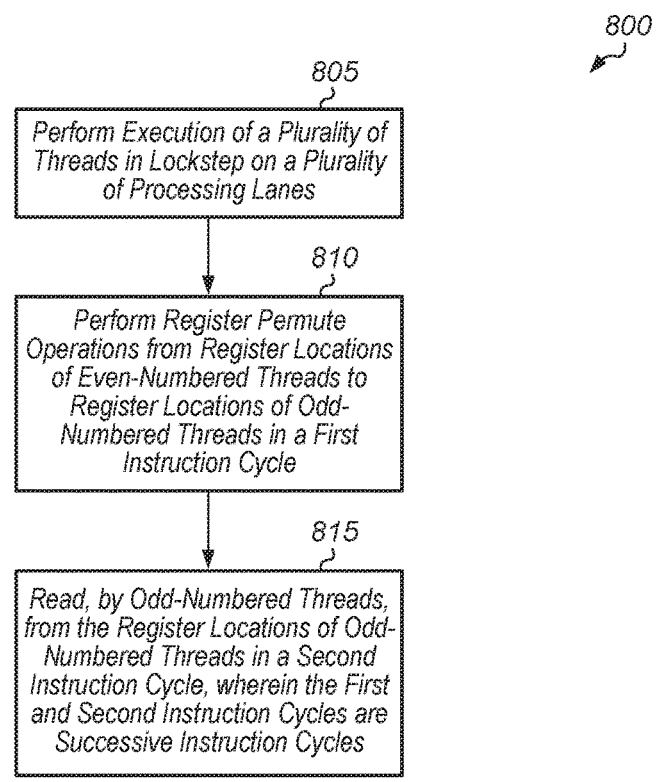
FIG. 8 is a generalized flow diagram illustrating one embodiment of a method for sharing data between multiple executing threads in an efficient manner.
Figure 9:
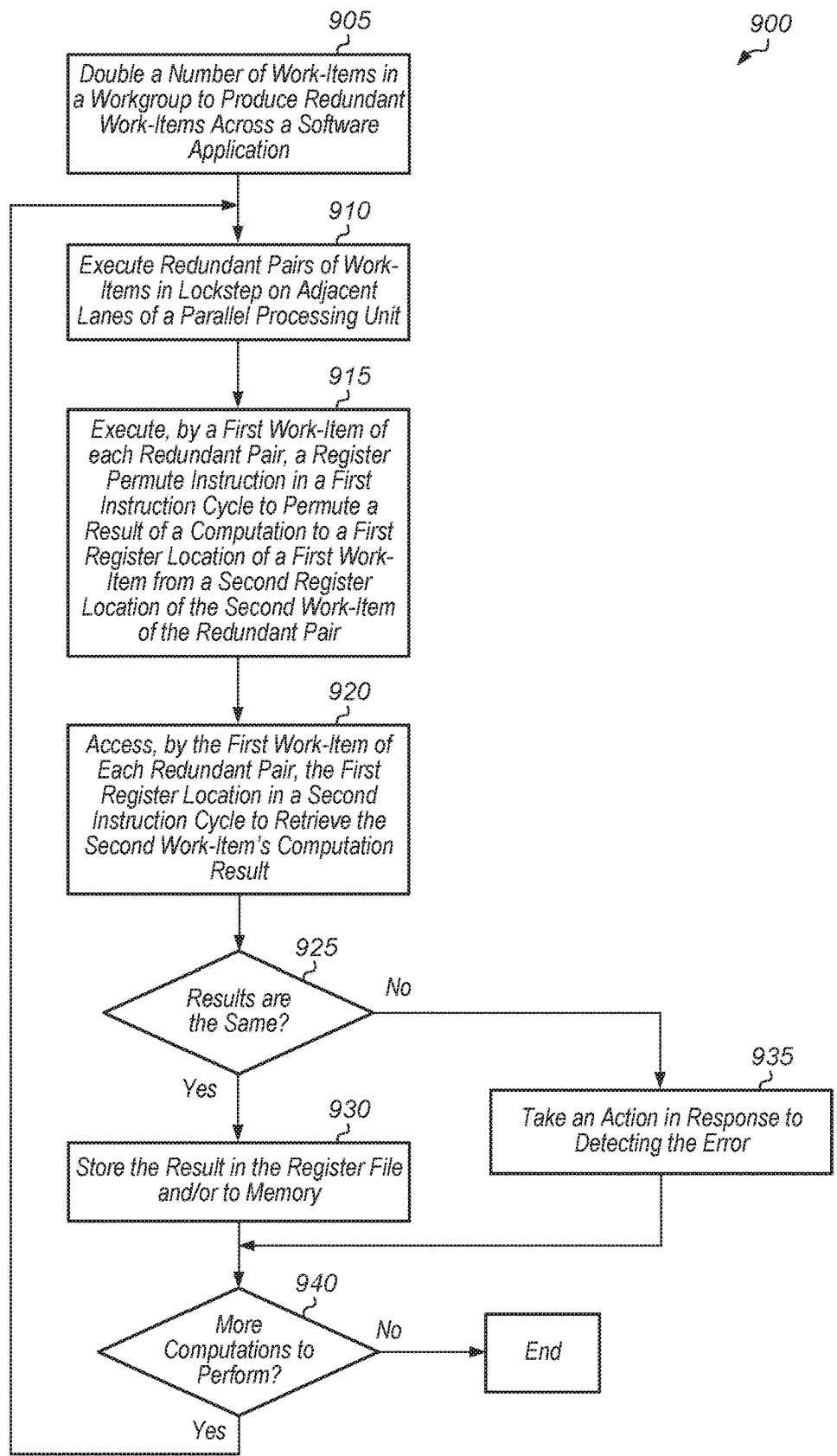
FIG. 9 is a generalized flow diagram illustrating one embodiment of a method for executing a RMT application on a parallel processing unit.

Referring now to FIG. 7, one embodiment of a method 700 for enabling bufferless communication between threads in a redundant multithreading (RMT) application is shown. For purposes of discussion, the steps in this embodiment and those of FIGS. 8-9 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 700.

A system doubles each thread of a plurality of threads within a workgroup to enable redundant execution for a redundant multithreading (RMT) application executing on a parallel processing unit (block 705). Then, a scheduler causes execution of a plurality of threads to be performed in lockstep on the parallel processing unit (block 710). In one embodiment, causing execution to be performed in lockstep includes starting each redundant pair of threads in the same clock cycle on a pair of adjacent processing lanes of the parallel processing unit. It is noted that the term "processing lane" is also referred to as a "processing element". In one embodiment, each pair of threads executes the same instructions as part of a RMT application.

A first thread executing on a first processing lane writes a first result of a first computation to a first register location of the register file in a first instruction cycle (block 715). Then, a register permute operation is performed from the first register location to a second register location in a second instruction cycle (block 720). The register permute operation copies the first result from the first register location to the second register location.

A second thread executing on a second processing lane reads from the second register location in a third instruction cycle, wherein the first, second, and third instruction cycles are successive instruction cycles (block 725). These operations are able to occur in successive instruction cycles since the first thread is executing in lockstep with the second thread. Therefore, it is known that the second thread will not be accessing the second register location in the second instruction cycle. In one embodiment, the first register location is associated with and accessible by the first thread executing on the first processing lane. Furthermore, in this embodiment, the first register location is inaccessible by the second thread executing on the second processing lane. After block 725, method 700 ends.

Turning now to FIG. 8, one embodiment of a method 800 for sharing data between multiple executing threads in an efficient manner is shown. The execution of a plurality of threads is performed in lockstep on a plurality of processing lanes of a parallel processing unit (block 805). In one embodiment, the plurality of processing lanes are numbered from 0 to N, wherein N is a total number of processing lanes, and wherein N is a positive integer. In this embodiment, a thread executing in a given processing lane is referred to by the number of the given processing lane. In one embodiment, the parallel processing unit is located within a GPU. In other embodiments, the parallel processing unit is located within any of various other types of processing units (e.g., CPU, field programmable gate array (FPGA), application specific integrated circuit (ASIC), digital signal processor (DSP)).

Register permute operations are performed from register locations of even-numbered threads to register locations of odd-numbered threads in a first instruction cycle (block 810). Next, the odd-numbered threads read from the register locations of odd-numbered threads in a second instruction cycle, wherein the second and first instruction cycles are successive instruction cycles (block 815). After block 815, method 800 ends.

Referring now to FIG. 9, one embodiment of a method 900 for executing a redundant multithreading (RMT) application on a parallel processing unit is shown. A number of work-items in a workgroup are doubled to produce redundant work-items across a software application (block 905). Then, the redundant pairs of work-items execute in lockstep on adjacent lanes of a parallel processing unit (block 910). A first work-item of each redundant pair of work-items performs a register permute operation in a first instruction cycle to permute a result of a computation to a first register location of a first work-item from a second register location of the second work-item of the redundant pair (block 915). Next, the first work-item of each redundant pair of work-items accesses the first register location in a second instruction cycle to retrieve the second work-item's result (block 920). It is assumed for the purposes of this discussion that the first and second instruction cycle are successive instruction cycles.

Then, the first work-item of each redundant pair compares the first work-item's result with the second work-item's result (conditional block 925). If the results are the same (conditional block 925, "yes" leg), then the result is stored in the register file and/or to memory (block 930). If the results are not the same (conditional block 925, "no" leg), then an action is taken in response to detecting the error (block 935). For example, in one embodiment, an error counter is incremented in response to detecting the error. Alternatively, in another embodiment, no action is taken in response to detecting the error. After blocks 930 and 935, if the threads have more computations to perform (conditional block 940, "yes" leg), then method 900 returns to block 910. If there are no more computations to perform (conditional block 940, "no" leg), then method 900 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
   duplicating an original thread to create a redundant thread;
   causing, by the scheduler, thread on a first processing lane and the redundant thread on a second processing lane to be performed in lockstep on a parallel processing unit;
   writing in a first instruction cycle, by the original thread, a first result of a first computation to a first register location of the register file;
   determining, by the original thread and the redundant thread, whether to perform a register permute operation in a second instruction cycle based on a value of a corresponding bit in an execution mask;
   performing in the second instruction cycle, by the original thread based on a value of a first bit in the execution mask, a register permute operation to copy the first result from the first register location to a second register location;
   performing in the second instruction cycle, by the redundant thread based on a value of a second bit in the execution mask, an operation to stay in lockstep with the original thread; and
   reading in a third instruction cycle, by the redundant thread, the first result from the second register location.

2. The method as recited in claim 1, wherein the redundant thread is configured to perform a nop operation in the second instruction cycle to stay in lockstep with the original thread.

3. The method as recited in claim 1, wherein the first register location is associated with the first processing lane, and wherein the first register location is inaccessible by the redundant thread executing on the second processing lane.

4. The method as recited in claim 1, further comprising:
   writing, by the redundant thread, a second result of a second computation to a third register location in the first instruction cycle;
   comparing, by the redundant thread, the second result to the first result stored in the second register location in the third instruction cycle; and
   performing, by the original thread, a nop operation in the third instruction cycle to stay in lockstep with the redundant thread.

5. The method as recited in claim 1, wherein the first instruction cycle, second instruction cycle, and third instruction cycle are consecutive instruction cycles.

6. The method as recited in claim 1, further comprising:
   performing register permute operations from register locations of odd-numbered threads to register locations of even-numbered threads in the second instruction cycle;
   reading, by even-numbered threads, values copied by the register permute operations in the third instruction cycle; and
   performing, by odd-numbered threads, operations which do not conflict with the even-numbered threads in the third instruction cycle.

7. The method as recited in claim 6, further comprising executing nop operations by the odd-numbered threads in the third instruction cycle to cause the odd-numbered threads to stay in lockstep with the even-numbered threads.

8. A parallel processing unit comprising:
   a plurality of processing lanes;
   one or more register files;
   wherein the parallel processing unit is configured to:
     duplicate an original thread to create a redundant thread;
     cause, by the scheduler, execution of the original thread on a first processing lane and the redundant thread on a second processing lane to be performed in lockstep on the parallel processing unit;
     write in a first instruction cycle by the original thread, a first result of a first computation to a first register location of the register file;
     determine, by the original thread and the redundant thread, whether to perform a register permute operation in a second instruction cycle based on a value of a corresponding bit in an execution mask;
     perform in the second instruction cycle, by the original thread based on a value of a first bit in the execution mask, a register permute operation to copy the first result from the first register location to a second register location;
     perform in the second instruction cycle, by the redundant thread based on a value of a second bit in the execution mask, an operation to stay in lockstep with the original thread; and
     read in a third instruction cycle, by the redundant thread, the first result from the second register location.

9. The parallel processing unit as recited in claim 8, wherein the redundant thread is configured to perform a nop operation in the second instruction cycle to stay in lockstep with the original thread.

10. The parallel processing unit as recited in claim 8, wherein the first register location is associated with the first processing lane, and wherein the first register location is inaccessible by the redundant thread executing on the second processing lane.

11. The parallel processing unit as recited in claim 8, wherein the parallel processing unit is further configured to:
    write, by the redundant thread, a second result of a second computation to a third register location in the first instruction cycle;

compare, by the redundant thread, the second result to the first result stored in the second register location in the third instruction cycle; and perform, by the original thread, a nop operation in the third instruction cycle to stay in lockstep with the redundant thread.

12. The parallel processing unit as recited in claim 8, wherein the parallel processing unit is further configured to prevent the redundant thread from accessing the second register location in the second instruction cycle.

13. The parallel processing unit as recited in claim 8, wherein the parallel processing unit comprises a register file for each processing lane, and wherein the parallel processing unit is further configured to:

perform register permute operations from register locations of odd-numbered threads to register locations of even-numbered threads in the second instruction cycle;

read, by even-numbered threads, values copied by the register permute operations in the third instruction cycle; and perform, by odd-numbered threads, operations which do not conflict with the even-numbered threads in the third instruction cycle.

14. A system comprising:

a parallel processing unit comprising a plurality of processing lanes;

a register file; and a scheduler;

wherein the system is configured to:

duplicate an original thread to create a redundant thread;

cause, by the scheduler, execution of the original thread on a first processing lane and the redundant thread on a second processing lane to be performed in lockstep on the parallel processing unit;

write in a first instruction cycle, by the original thread, a first result of a first computation to a first register location of the register file;

determine, by the original thread and the redundant thread, whether to perform a register permute operation in a second instruction cycle based on a value of a corresponding bit in an execution mask;

perform in the second instruction cycle, by the original thread based on a value of a first bit in the execution mask, a register permute operation to copy the first result from the first register location to a second register location;

perform in the second instruction cycle, by the redundant thread based on a value of a second bit in the execution mask, an operation to stay in lockstep with the original thread; and read in a third instruction cycle, by the redundant thread, the first result from the second register location.

15. The system as recited in claim 14, wherein the redundant thread is configured to perform a nop operation in the second instruction cycle to stay in lockstep with the original thread.

16. The system as recited in claim 14, wherein the first register location is associated with the first processing lane, and wherein the first register location is inaccessible by the redundant thread executing on the second processing lane.

17. The system as recited in claim 14, wherein the system is further configured to:

write, by the redundant thread, a second result of a second computation to a third register location in the first instruction cycle;

compare, by the redundant thread, the second result to the first result stored in the second register location in the third instruction cycle; and perform, by the original thread, a nop operation in the third instruction cycle to stay in lockstep with the redundant thread.

18. The system as recited in claim 14 wherein the first instruction cycle, second instruction cycle, and third instruction cycle are consecutive instruction cycles.

19. The system as recited in claim 14, wherein the system comprises a register file for each processing lane, and wherein the system is further configured to:

perform register permute operations from register locations of odd-numbered threads to register locations of even-numbered threads in the second instruction cycle;

read, by even-numbered threads, values copied by the register permute operations in the third instruction cycle; and perform, by odd-numbered threads, operations which do not conflict with the even-numbered threads in the third instruction cycle.

20. The system as recited in claim 19, wherein the odd-numbered threads are configured to execute nop operations in the third instruction cycle to cause the odd-numbered threads to stay in lockstep with the even-numbered threads.

* * * * *